March 13, 1956  W. C. McBRIDE  2,738,168
AUXILIARY DENTAL CHAIR FOR CHILDREN
Filed April 13, 1954
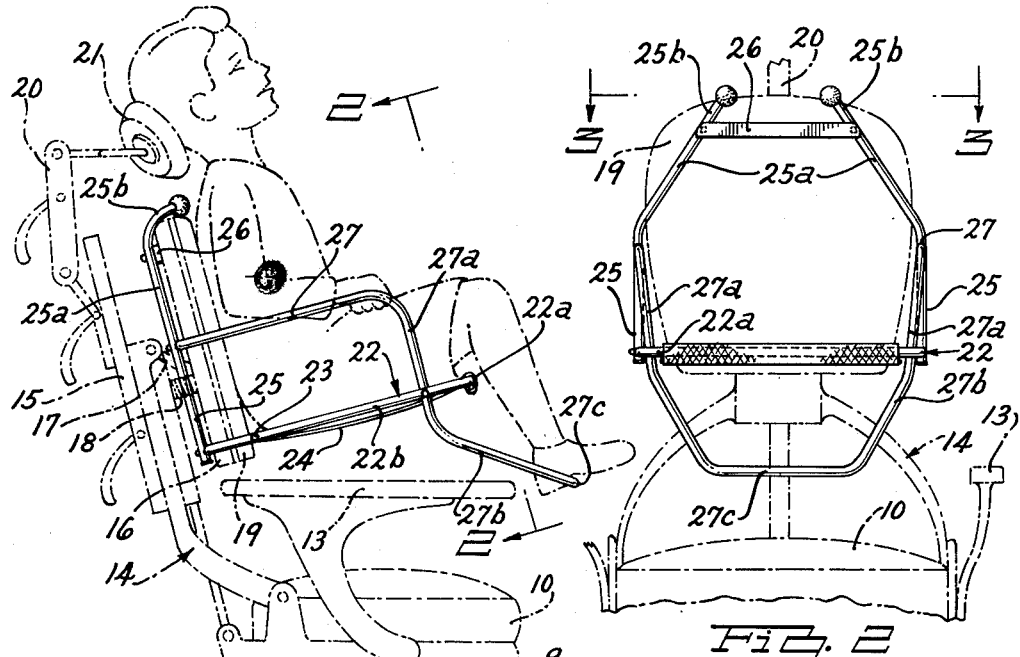
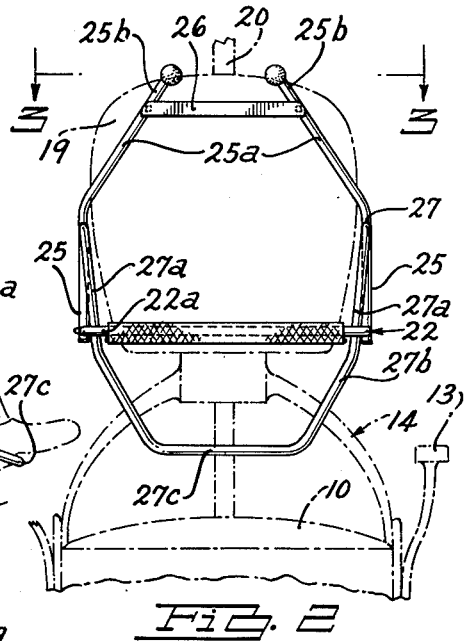
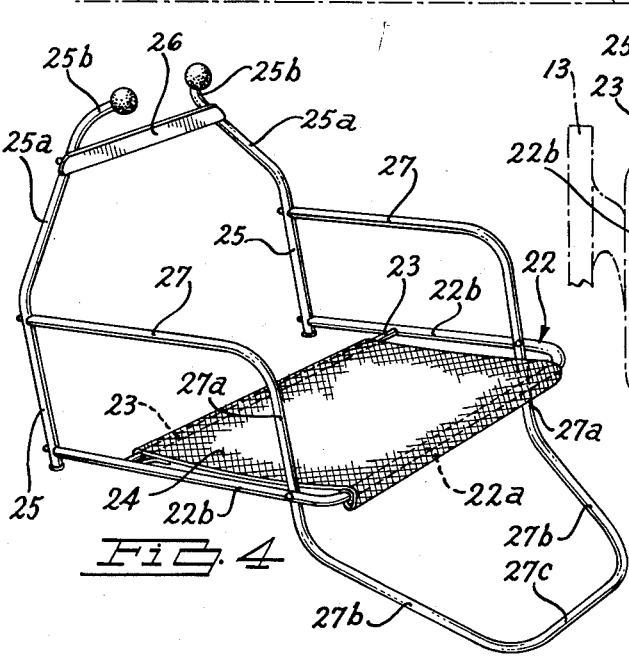
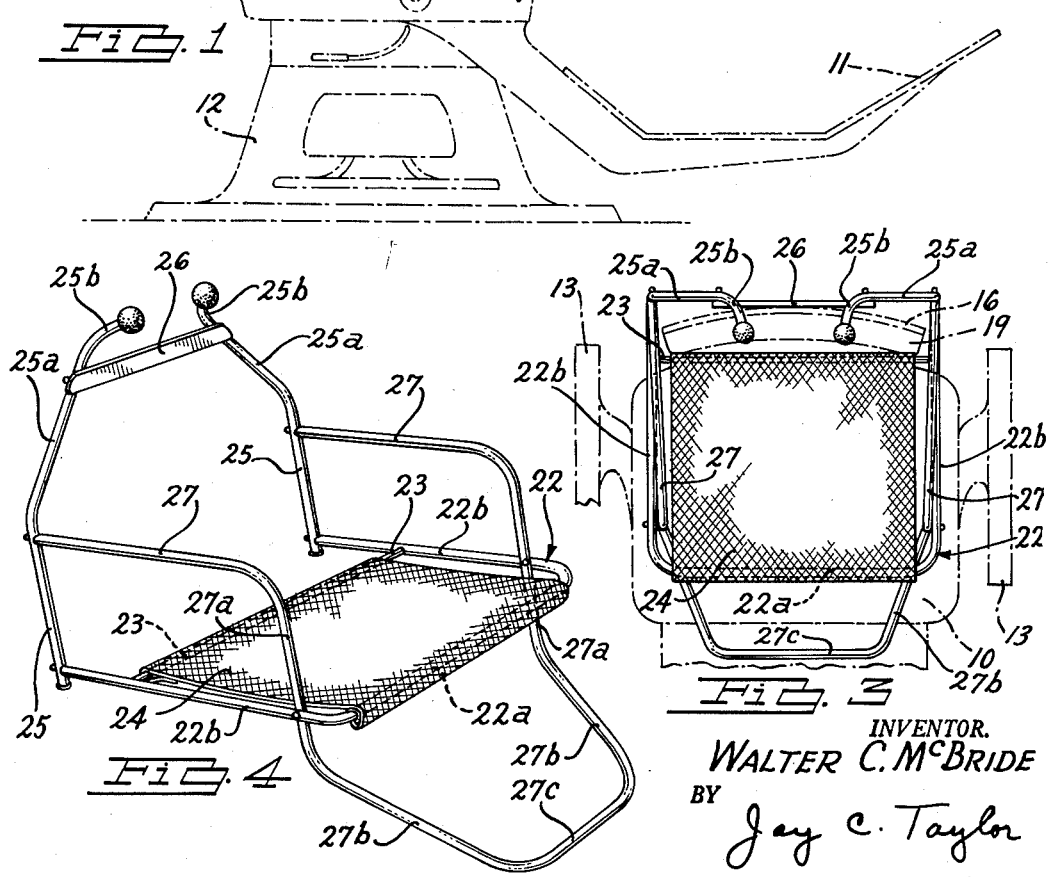
INVENTOR.
WALTER C. McBRIDE
BY Jay C. Taylor
ATTORNEY United States Patent Office 2,738,168
Patented Mar. 13, 1956

2,738,168
AUXILIARY DENTAL CHAIR FOR CHILDREN

Walter C. McBride, Detroit, Mich.

Application April 13, 1954, Serial No. 422,801

7 Claims. (Cl. 155—131)

This invention relates to improvements in a dental chair and has for a primary object the provision of an improved child's auxiliary seat structure cooperable with the back rest of a conventional adult's dental chair to be removably mounted therein and to comprise sturdy means for comfortably supporting and confining a child dental patient at a height convenient to the dentist.

Another object is to provide an auxiliary structure of the foregoing character which is simply and economically fabricated primarily from lightweight tubular stock and which is positively and securely supported solely by engagement with the back rest of the adult's dental chair, whereby the auxiliary structure is readily mounted on or removed from the seat back.

Another object is to provide a child's auxiliary dental seat structure in combination with an adult's back rest wherein transverse upper and lower bumper rods engage the upper rear and lower front portions respectively of the back rest. A seat portion of the structure extends forwardly from the lower bumper bar whereby, when the weight of a child is placed on the seat portion, the upper and lower bumper rods are forced firmly against the back rest in a combined cocking and clamping action to bind the back rest firmly therebetween. The auxiliary structure also comprises side and back members connected together and to the frame of the seat portion in mutually reinforcing relations. The side members extend rearwardly of the back rest at opposite sides thereof and limit lateral movement of the seat structure with respect to the back rest. The back members comprise paired rods which extend upwardly from the side members respectively at the rear of the back rest and converge toward transversely spaced upper end portions which in turn extend forwardly over the top of the back rest and are supported thereon.

Other objects of this invention will appear in the following description and appended claims, reference being had to the accompanying drawings forming a part of this specification wherein like reference characters designate corresponding parts in the several views.

Fig. 1 is a side elevational view showing an auxiliary seat structure embodying the present invention and mounted on the back rest of a dental chair.

Fig. 2 is a fragmentary view taken in the direction of the arrows substantially along the line 2—2 of Fig. 1, showing a front view of the auxiliary seat structure.

Fig. 3 is a fragmentary view taken in the direction of the arrows substantially along the line 3—3 of Fig. 2, showing a top plan view of the auxiliary seat structure.

Fig. 4 is a perspective view of the auxiliary seat structure detached from the dental chair, as viewed from the front and one side and somewhat above the seat portion.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in more particularity to the drawings, the present invention is illustrated by way of example with an adult's dental chair comprising a support 9 for a seat cushion 10 and having a forwardly projecting foot-rest 11. The support 9 is adjustably mounted on a foundation 12 so as to be adjustably pivotal about a vertical axis and shiftable vertically, as for example by hydraulic means not shown. Also mounted on opposite sides of the support 9 are a pair of laterally adjustable arm-rests 13. Pivoted on the support 9 at the rear thereof is a bracket structure 14 having a vertically adjustable back-rest support 15 slideably mounted thereon. Projecting forwardly from the support 15 and connecting the latter with the backing 16 of a back-rest is a bracket 17 which engages the backing 16 at locations intermediate the latter's sides to support the same. The bracket 17 is pivotally connected to the support 15 to swing vertically and is yieldingly retained in position by a shock absorbing spring 18. By reason of the foregoing structure, the lateral portions of the back-rest are unencumbered by attachment with other portions of the dental chair, such as the arm-rests 13 or supports 14 and 15.

Coextensive with and suitably secured to the backing 16, which preferably comprises a rigid material such as metal or hard wood, is a forward cushion or upholstered back-rest portion 19. As illustrated in Figs. 2 and 3, the backing 16 and upholstery 19 are curved transversely to provide a concave back-rest adapted to conform to the back of a patient seated in the chair, the top of the back rest being arched symmetrically with respect to the vertical median plane of the chair. Also adjustably mounted on the support 15 is a vertically slidable bracket 20 for a head-rest 21. The various adjustable elements are suitable releasably secured in their adjusted positions and are described herein primarily for purposes of identification. Since the dental chair structure illustrated may be conventional if desired, it is not described in further detail.

The auxiliary seat structure adapted to be removably mounted on the back-rest 16, 19 comprises a rigid frame of light weight material, preferably of tubular metal stock such as aluminum alloy tubing. A U-shaped seat frame member 22 comprises in the present instance a formed tubular rod having a forward horizontal transverse seat supporting portion 22a and rearwardly extending lateral portions 22b. Spacing and connected at opposite ends to the portions 22b forwardly of their rear ends is a horizontal transverse lower bumper rod or member 23 adapted to engage the forward cushion 19 of the back-rest as described below and also to support the rear edge of a seat 24. The latter may comprise any material having sufficient strength to support the weight of a child seated thereon, such as a flexible plastic or fabric sheeting, and is supported forwardly by the rod portion 22a.

Extending upwardly from the rear ends of the portions 22b and connected thereto are a pair of rear members of the auxiliary seat comprising tubular rods 25. The latter extend vertically to the approximate level desired for a child's arm-rest, then converge upwardly toward each other at 25a and terminate in forwardly extending end portions 25b spaced transversely from each other. Immediately below the forwardly extending end portions 25b is a horizontal transverse upper bumper rod or member 26 secured at its opposite ends to the portions 25a.

Extending forwardly from adjacent the upper ends of the vertical portions 25 and secured thereto are a pair of arm-rest members 27. The latter comprise tubular rods which bend downwardly at 27a in parallelism with the vertical portions 25 and are secured to the forward ends of the portions 22b interiorly thereof. Below the portions 22b, the members 27 decline at 27b and converge forwardly toward each other, terminating in inbent portions joined to comprise a horizontal foot-rest 27c parallel to the portion 22a and located below and somewhat forwardly of the latter.

By virtue of the foregoing, the back of the auxiliary seat structure is open except for the bumper rod 26. The various elements are dimensioned with respect to the back-rest 16, 19 so as to fit over the top thereof with the upper bumper 26 engaging the upper rear portion of the backing 16 and with the lower bumper 23 engaging the lower forward portions of the cushion 19. In the assembled position, Figs. 1, 2 and 3, the upper end portions 25b overlie and rest on the arched top of the back-rest at opposite sides of the median crest thereof. Upon the exertion of downward force on the seat 24, as for example by the weight of a child sitting thereon, a cocking action results whereby the bumper 23 presses rearwardly against the forward lateral portions of the cushion 19 and the bumper 26 presses forwardly against the backing 16. Thus the back-rest is securely clamped between the bumpers 23 and 26, whereby accidental displacement of the auxiliary seat structure with respect to the back-rest is avoided.

In addition the upper end portions 25b are supported on the upper surface of the back-rest to achieve positive support for the weight of a child on the seat 24. Preferably the portions 25b terminate adjacent the forward plane of the cushion 19 so as to avoid projecting into the back of the child. Also when the auxiliary structure is mounted on the back-rest as described, the lateral portions 27 and 22b extend rearwardly of the back-rest adjacent its opposite sides, thereby to limit accidental tilting of the auxiliary seat structure to one side or the other with respect to the back-rest. In this latter regard, the transversely spaced forwardly extending upper portions 25b cooperate with the arched top of the back-rest to prevent lateral slipping of the auxiliary structure. In order to slide laterally, one of the portions 25b must be elevated against the force of the weight on the seat 24 and the other portion 25b will be correspondingly lowered. In consequence the elevated portion 25b will sustain a greater proportion of the weight and the other portion 25b will be correspondingly relieved. A stabilizing effect is thus achieved which prevents accidental lateral shifting of the auxiliary seat structure with respect to the back-rest. This effect is enhanced by reason of the concavity of the cushion 19, whereby the lateral portions of the bumper 23 engaging the cushion 19 press into the latter and positively interlock therewith.

I claim:

1. In a child's auxiliary dental seat structure adapted to be mounted on an adult's dental chair back rest of the type having unencumbered lateral portions, a lower bumper portion adapted to engage the lower forward portion of said back rest, a seat supported at its rear edge by said bumper portion and extending forwardly therefrom, side portions connected to opposite lateral ends of said bumper portion to support the same and extending rearwardly therefrom to be spaced by said back rest, an upper bumper portion adapted to engage the upper rearward portion of said back rest, rear portions adapted to extend rearwardly of said back rest and connecting said upper bumper portion with said side portions, said rear portions also extending upwardly from said upper bumper portion and terminating in forwardly extending upper portions adapted to engage the top of said back rest to be supported thereon.

2. In a child's auxiliary dental seat structure adapted to be mounted on an adult's dental chair back rest of the type having unencumbered lateral portions, a frame comprising upper and lower bumper members adapted to engage the upper rear and lower front portions respectively of said back rest, a pair of side members connected forwardly of their rear ends to opposite lateral ends of said bumper member, a pair of rear members connecting said side members with the corresponding lateral ends of the upper bumper member and terminating in forwardly extending upper portions adapted to engage the top of said back rest to be supported thereon, a forward seat member spacing and connected to said side members, and a seat supported by said lower bumper member and forward seat member, said members being arranged to fit over said back rest with the rear ends of said side members containing said back rest therebetween.

3. In a child's auxiliary dental seat structure adapted to be removably supported on the back rest of an adult's dental chair, a frame of formed rods comprising a pair of laterally spaced generally upright back rods having forwardly extending upper end portions, a transverse upper bumper rod connecting said back rods below said forwardly extending end portions, a seat supporting rod having a horizontal transverse forward portion spacing a pair of rearwardly extending lateral portions connected at their rear ends with the lower ends of said back rods, and a transverse lower bumper rod connecting said lateral portions at locations spaced forwardly of said upper bumper rod, and a seat spanning said forward portion and lower bumper rod, said frame being dimensioned to fit over the top of said back rest with said forwardly extending upper end portions overlying and supported on said top and with said upper and lower bumper rods engaging the upper rear and lower forward portions respectively of said back rest.

4. In a child's auxiliary dental seat structure adapted to be removably supported on the back rest of an adult's dental chair, a frame of formed rods comprising a pair of laterally spaced generally upright back rods having forwardly extending upper end portions, a transverse upper bumper rod connecting said back rods below said forwardly extending end portions, a seat supporting rod having a horizontal transverse forward portion spacing a pair of rearwardly extending lateral portions connected at their rear ends with the lower ends of said back rods, a transverse lower bumper rod connecting said lateral portions at locations spaced forwardly of said upper bumper rod and also forwardly of the rear ends of said lateral portions, and a pair of lateral arm rest rods having rear ends connected to said back rods respectively and having forward depending portions connected to said lateral portions respectively adjacent said forward transverse portion, said depending portions terminating below said forward transverse portion in forwardly declining converging portions joined at their forward ends by a transverse foot rest portion, and a seat spanning said forward portion and lower bumper rod, said frame being dimensioned to fit over the top of said back rest with said forwardly extending upper end portions overlying and supported on said top and with said upper and lower bumper rods engaging the upper rear and lower forward portions respectively of said back rest.

5. In a child's auxiliary dental seat structure adapted to be mounted on an adult's dental chair back rest of the type having unencumbered lateral portions, a frame having side portions adapted to contain said back rest therebetween, said frame also having back and front portions, said back and front portions having upper and lower bumpers respectively adapted to engage the upper rear and lower front portions respectively of said back rest in a clamping action, the back portion also having an upwardly extending portion terminating in a forwardly extending portion adapted to overlie the top of said back rest to be supported thereon.

6. In a child's auxiliary dental seat structure adapted to be mounted on an adult's dental chair back rest of the type having unencumbered lateral portions, a frame having side portions adapted to contain said back rest therebetween, said frame also having back and front portions, said back and front portions having upper and lower transverse bumper rods respectively adapted to extend transversely across said back rest in contact with the upper rear and lower front portions thereof respectively in a clamping action, the back portion also having an upwardly extending portion terminating in a forwardly extending portion adapted to overlie the top of said back rest to be supported thereon, said frame also including a seat supporting portion adapted to overlie the seat of said adult's dental chair in spaced relation above the latter and forwardly of said back rest.

7. In a child's auxiliary dental seat structure adapted to be mounted on an adult's dental chair back rest of the type having unencumbered lateral portions, a frame having a back portion including an upper transverse bumper rod adapted to extend transversely across the upper rear portion of said back rest in contact therewith and also including an upwardly extending portion terminating in a forwardly extending portion adapted to overlie the top of said back rest to be supported thereon, said frame also having a forward portion including side portions extending forwardly from said back portion at opposite sides of said back rest and also including a lower transverse bumper rod adapted to extend transversely across the forward portion of said back rest in contact therewith at a location below said upper transverse bumper rod, said forward portion also including a seat supporting portion adapted to overlie the seat of said adult's dental chair in spaced relation above the latter and forwardly of said back rest, said lower bumper rod comprising the rear of said seat supporting portion whereby the weight of a child thereon urges said upper and lower bumper rods forwardly and rearwardly respectively in a clamping action against said back rest.

References Cited in the file of this patent

UNITED STATES PATENTS

| | | |
|---|---|---|
| 557,063 | Faneuf | Mar. 24, 1896 |
| 1,370,986 | Mudd | Mar. 8, 1921 |